June 17, 1930.  R. VYDRA  1,764,540
ARTIFICIAL TREE
Filed Jan. 3, 1929
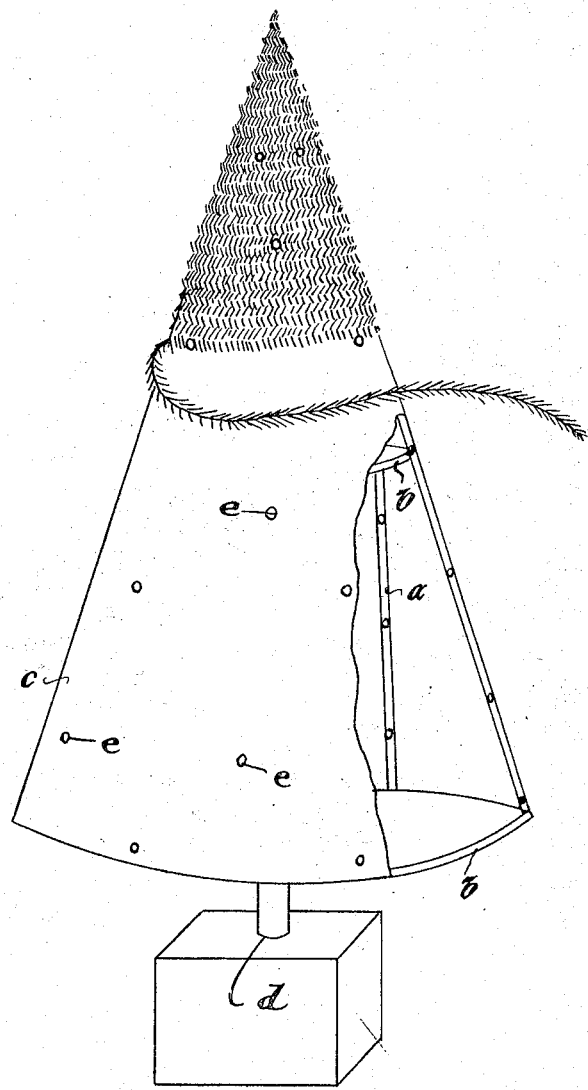
Inventor:
Robert Vydra Patented June 17, 1930

1,764,540

UNITED STATES PATENT OFFICE

ROBERT VYDRA, OF NUREMBERG, GERMANY

ARTIFICIAL TREE

Application filed January 3, 1929, Serial No. 330,071, and in Germany November 30, 1928.

My present invention relates to artificial trees of any kind such as the well known Christmas trees, fancy or decorative trees, which may be manufactured in different forms, as conically or pyramidically shaped or in the shape of an obelisk, a ball or the like. According to the invention the branches are not fixed on the stem as usual but ropes embodying the foliage or the needles respectively are wound around a lattice work, whereby the said ropes are made in long veins of any suitable material. The material wound around the lattice work may be manufactured in any colour and also the lattice work may be of any suitable material.

The annexed drawing shows by way of example a form of my invention in a perspective view partly in section without defining its limits.

On the drawing is illustrated a tree having a conical form, which is shaped by a lattice work $a$ covered with pasteboard $c$ and provided for example at the middle and at the foot with horizontal disks $b$ of different diameters embodying the form and having the purpose of stiffening the lattice work in its horizontal direction. Around the form shaped in such a manner ropes embodying the foliage or the needles respectively are wound which are manufactured in long veins of any suitable material or stuff, such as coloured feathers, paper, straw, imitation silk, woody fibres or the "Hinoki Festoonings", a material well known in the United States of America.

The stem is fixed in a socket $d$ and on the several braces of the lattice work a number of members are provided which receive electrical lamps $e$.

What I claim is:

1. An artificial tree of conical form with ropes wound in long veins around the conical form, comprising in combination a lattice work, a covering of even pasteboard arranged around said lattice work, horizontal reinforcing disks fixed at the middle and the foot of said lattice work.

2. An artificial tree as claimed in claim 1 comprising in combination a conically formed lattice work, a covering fixed on said lattice work, electrical lamps fixed in said covering.

In testimony whereof I affix my signature.
ROBERT VYDRA.